Patented Dec. 12, 1939

2,182,827

UNITED STATES PATENT OFFICE 2,182,827

CYCLOHEXYLATED CHLORO-DIPHENYL ETHERS

Frank B. Smith, Midland, Mich., assignor to The Dow Chemical Company, Midland, Mich., a corporation of Michigan No Drawing. Application November 18, 1938, Serial No. 241,180

5 Claims. (Cl. 260—612)

This invention concerns certain new chemical products prepared by reaction between a chloro-diphenyl ether containing not more than three chlorine atoms per diphenyl ether residue and cyclohexene or other cyclohexylating agent. These products, herein referred to as "cyclohexylated chloro-diphenyl ethers", have the general formula:

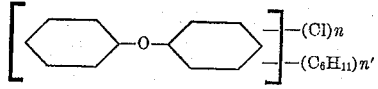

wherein $n$ represents an integer not greater than 3, and $n'$ represents an integer not greater than 4.

The new cyclohexylated chloro-diphenyl ethers vary in physical characteristics from high-boiling liquids to hard, brittle resins, depending upon the number of cyclohexyl groups and chlorine atoms present in the molecule. They have good dielectric properties and accordingly may be employed as insulating media in electrical equipment. The liquid products are well adapted to be employed as plasticizing agents for various plastic materials, particularly cellulose ethers and polystyrene. The solid, resinous products may also be used to plasticize such materials and are usually employed in combination with other plasticizing agents to prepare compositions having good flexibility and high surface hardness.

My new products are prepared by reacting a cyclohexylating agent with a monochloro-, dichloro-, or trichloro-diphenyl ether, or preferably a mixture of such compounds, in the presence of a condensing agent, e. g. aluminum chloride, boron trifluoride, ferric chloride, aluminum bromide, or an activated bleaching earth such as "Retrol" or "Tonsil", etc. The cyclohexylating agent is preferably cyclohexene, but cyclohexyl chloride, cyclohexyl bromide, or cyclohexanol may be used as such agent.

The reactants may be employed in any desired proportions, although the products obtained vary somewhat with changes in such proportions. For example, a chloro-diphenyl ether may be reacted with its molecular equivalent of a cyclohexylating agent to produce a mixture comprising mono-cyclohexylated chloro-diphenyl ethers together with some di-cyclohexylated and other poly-cyclohexylated chloro-diphenyl ethers. The poly-cyclohexylated products may be obtained in increased yield by increasing the proportion of the cyclohexylating agent employed in the reaction or by cyclohexylating the mono-cyclohexylated products obtained from a previous reaction. Ordinarily, however, I prefer to employ approximately 1 to 4 mols of the cyclohexylating agent per mol of chloro-diphenyl ether. The proportion of catalyst varies somewhat with the particular reactants employed and the conditions under which the reaction is carried out, but I usually employ approximately 0.01–0.1 part by weight of catalyst per part of chloro-diphenyl ether.

The reaction is conveniently carried out by adding the cyclohexylating agent to a heated and well-stirred mixture of the chloro-diphenyl ether and catalyst, and thereafter continuing the heating and stirring until the reaction is complete. The reaction temperature is usually maintained at 150°–250° C., although higher temperatures may be employed, particularly when a molecular excess of the cyclohexylating agent is used. The temperature is, of course, below that at which the products undergo appreciable decomposition. The reaction is usually complete in from 2 to 15 hours, although the time may be shortened somewhat by carrying out the reaction under pressure in a closed vessel. When the reaction is complete, the mixture is treated to remove the catalyst, and any unreacted chloro-diphenyl ether, polymerized cyclohexene, etc. is removed by fractional distillation. The mixture of cyclohexylated chloro-diphenyl ethers so obtained may be employed directly as a plasticizing agent, dielectric medium, etc. or it may be fractionally distilled under vacuum to obtain fractions consisting substantially of isomeric mono-cyclohexyl chloro-diphenyl ethers, isomeric di-cyclohexyl chloro-diphenyl ethers, etc.

The following examples illustrate certain ways in which the principle of the invention has been applied, but are not to be construed as limiting the same:

Example 1

613.5 grams (3.0 mols) of a mixture of isomeric mono-chloro-diphenyl ethers and 20 grams (3.2 per cent by weight of the chloro-diphenyl ether) of "Retrol" were placed in a flask fitted with a thermometer, stirrer, and reflux condenser, and were heated to 210° C. to drive off the residual water contained in the "Retrol". 246.0 grams (3.0 mols) of cyclohexene was then added gradually with stirring over a period of 1½ hours during which time the temperature was maintained at 200°–220° C. The reaction mixture was cooled to 150° C. and was filtered to remove the catalyst. The cyclohexylated mono-chloro-diphenyl ether product was a light yellow viscous liquid. It was fractionally distilled under vacuum, as shown in Table I below, to obtain fractions representing mono-cyclohexyl mono-chloro-diphenyl ethers, di-cyclohexyl mono-chloro-diphenyl ethers, etc., and mixtures of the same. Fraction 4, comprising a mixture of mono- and di-cyclohexyl mono-chloro-diphenyl ether was found to be particularly valuable as a plasticizing agent for cellulose ether and polystyrene plastic compositions.

Table I

| Fraction No. | Appearance | Distillation range, °C. | Yield, grams | Specific gravity at 25/25° C. | Index of refraction $n_D^{20}$ | Probable composition |
|---|---|---|---|---|---|---|
| 1 | Clear thin liquid | Up to 140 at 5 mm | 85 | | | Unreacted chloro-diphenyl ethers. |
| 2 | Pale yellow liquid | 140–187 at 5 mm | 128 | 1.1842 | 1.5840 | Mixture of chloro-diphenyl ethers and mono-cyclohexyl chloro-diphenyl ethers. |
| 3 | Light yellow liquid | 187–205 at 5.5 mm | 173 | 1.1257 | 1.5739 | Isomeric mono-cyclohexyl chloro-diphenyl ethers. |
| 4 | Light yellow slightly viscous liquid. | 205–215 at 5.5 mm | 143 | 1.1243 | 1.5740 | Mixture of mono- and di-cyclohexyl chloro-diphenyl ethers. |
| 5 | Very viscous brown liquid | Above 215 at 5.5 mm | 185 | 1.0872 at 60/60° C | 1.5559 at 60° C | Poly-cyclohexyl chloro-diphenyl ethers. |

*Example 2*

A mixture of 478 grams (2.0 mols) of isomeric di-chloro-diphenyl ethers and 15 grams of "Retrol" was heated to 200° C. to drive off the residual water contained in the "Retrol" as in Example 1. The temperature of the mixture was then raised to 250° C. and 145 grams (1.77 mols) of cyclohexene was added gradually over a period of 11.5 hours. During the addition of cyclohexene an additional 15 grams of the catalyst was added to increase the speed of reaction. Upon completion of the reaction, the mixture was cooled and filtered. The cyclohexylated di-chloro-diphenyl ether product was a golden yellow fluorescent liquid. It was fractionally distilled under vacuum, whereby the following fractions were obtained:

Table II

| Fraction No. | Appearance | Distillation range, °C. | Specific gravity 25/25° C. | Index of refraction $n_D^{20}$ | Probable composition |
|---|---|---|---|---|---|
| 1 | Colorless, mobile oil | 103–200 at 20 mm | | | Unreacted di-chloro-diphenyl ethers. |
| 2 | do | 200–210 at 20 mm | 1.303 | 1.5937 | Mixture of di-chloro-diphenyl ethers and mono-cyclohexyl di-chloro-diphenyl ethers. |
| 3 | do | 210–213 at 20 mm | 1.272 | 1.5891 | Cyclohexyl di-chloro-diphenyl ethers. |
| 4 | Slightly viscous liquid | 213–242 at 20 mm | 1.203 | 1.5796 | Mixture of mono- and di-cyclohexyl di-chloro-diphenyl ethers. |
| 5 | Viscous yellow oil | 242–260 at 20 mm | 1.165 | 1.5748 | Di-cyclohexyl di-chloro-diphenyl ethers. |
| 6 | Soft yellow semi-solid | Above 260 at 20 mm | 1.066 at 60/60° C | 1.5578 at 60° C | Poly-cyclohexyl di-chloro-diphenyl ethers. |

Other modes of applying the principle of my invention may be employed instead of those explained, change being made as regards the materials herein disclosed, provided the products stated by any of the following claims or the equivalent of such stated products be obtained.

I therefore particularly point out and distinctly claim as my invention:

1. A cyclohexylated chloro-diphenyl ether having the general formula

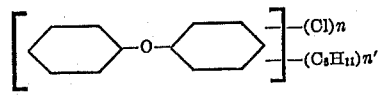

wherein $n$ represents an integer not greater than 3, and $n'$ represents an integer not greater than 4.

2. A cyclohexylated mono-chloro-diphenyl ether having the general formula

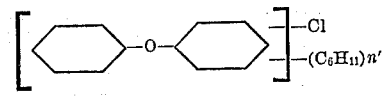

wherein $n'$ represents an integer not greater than 4.

3. A cyclohexylated di-chloro-diphenyl ether having the general formula

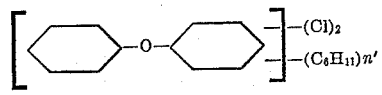

wherein $n'$ represents an integer not greater than 4.

4. A mixture consisting substantially of mono- and di-cyclohexyl mono-chloro-diphenyl ethers, said mixture being a light yellow liquid distilling at temperatures between about 205° C. and about 215° C. under 5.5 millimeters pressure and having a specific gravity of about 1.124 at 25/25 degrees C.

5. A mixture consisting substantially of di-cyclohexyl di-chloro-diphenyl ethers, said mixture being a viscous yellow liquid distilling at temperatures between about 242° C. and about 260° C. under 20 millimeters pressure and having a specific gravity of about 1.069 at 60/60 degrees C.

FRANK B. SMITH.